Sept. 24, 1957  M. L. SWEENEY, JR  2,807,336

DAMPING APPARATUS

Filed April 11, 1955

INVENTOR.
MORGAN L. SWEENEY, JR.

BY Elliott & Pastoriza
ATTORNEYS

United States Patent Office 2,807,336
Patented Sept. 24, 1957

2,807,336

DAMPING APPARATUS

Morgan L. Sweeney, Jr., Los Angeles, Calif.

Application April 11, 1955, Serial No. 500,620

3 Claims. (Cl. 188—97)

This invention relates to damping apparatus, and more particularly to an improved valving control means in combination with fluid type viscous dampers. A preferred application of the invention is in the damping out of forces set up by harmonic vibrations of relatively high frequency and small amplitude, and the particular embodiment chosen for illustrative purposes will be described in this connection. It is to be understood, however, that features of the invention are applicable to any type of fluid damping mechanism.

Conventional fluid damping apparatus usually comprises a fluid chamber provided with a movable element in the form of a piston or vane. This element is mechanically connected to the structural member whose undesired motions and forces are to be damped. Movement of the element through the fluid chamber as a result of these forces is resisted by viscous fluid within the chamber, the resisting force or torque developed in the mechanism being a function of the speed of the movement and the freedom with which the fluid can flow from one side of the piston or vane to the other. Generally, a restricting orifice is used to control this flow of fluid. By varying the dimensions of this orifice, the resisting force offered to the movable element may be partially controlled.

In the case of destructive type fluttering vibrations of relatively high frequency and small amplitude, such as often occur in aircraft control surfaces, the peak speed of a piston or vane through fluid in a fluid chamber is relatively high and the fluid resisting force correspondingly high. These high forces can oftentimes cause a structural failure.

A certain degree of control over peak forces may be had by increasing the size of the relief orifice through which much of the fluid is forced to flow. However, if this orifice is made sufficiently large to limit the maximum contemplated resisting torques, the resisting forces offered to the movable element during relatively low frequency, larger amplitude vibrations or motions, will generally be too low for effective damping of these motions.

On the other hand, there may be instances in which it is desired to increase the resisting forces developed with increases in the forces to be damped. In this event, it would be desirable to provide an orifice for the higher frequency vibrations which is smaller than the orifice for the lower frequency vibrations. In any event, it would still be desirable to limit the maximum contemplated damping forces to avoid damaging the damping structure.

Another problem in connection with high frequency damping resides in the valving necessary for controlling the fluid flow through an orifice. The use of conventional type check valves employing a ball and seat is ruled out because of their large operating inertia. Thus, while such valves may be satisfactory for normal damping operations, they cannot function with sufficient speed to control the back and forth flow of fluid set in motion by the rapid motions of the damping piston or vane when subjected to high frequencies.

Bearing the above in mind, it is a primary object of the present invention to provide an improved damping apparatus incorporating a novel valve control means for automatically adjusting the resisting forces offered to a damping vane or piston, whereby both high and low frequency motion may be effectively damped.

A more particular object in this connection, is to provide a novel valve control means for automatically varying the energy dissipation in any desired arbitrary manner with varying fluid pressures, whereby for slow, relatively constant speed movements of the vane, only a small force need be established.

Still another object is to provide valve control means for limiting the maximum resisting torques, so that overstressing of either the damper parts or the structural members to which the damper is attached will be prevented.

Another important object of the invention is to channel the fluid of a damping apparatus through a controlling orifice or port opening in one direction by means of small inertia reed type valves capable of opening and closing at a frequency corresponding to the relatively rapid fluid movements resulting from high frequency, small amplitude vibrations.

Briefly, these and other objects and advantages of this invention are attained by providing a valve member having a port opening. This port opening serves as an orifice for passing fluid in a damping chamber from one side of a movable damping element to the other. The area of the opening effective in passing fluid is controlled by eclipsing portions of the opening through relative movement of the valve member and a suitable covering or eclipsing means. The degree of movement is in turn controlled by fluid pressure acting on the valve member. The geometry of the port opening may be of a predetermined configuration so that any given functional relationship between the fluid pressure and resistance offered to fluid flow by the uneclipsed area of the port opening may be achieved. All of the various configurations, however, incorporate the feature of insuring that increases in the damping forces beyond a given magnitude will increase the effective port opening in the valve member sufficiently to limit such forces to safe values.

In order to pass fluid through the valve member port opening in one direction at all times, suitable control check valves are provided as a part of the control valving means. These check valves comprise reeds capable of rapid action in view of their relatively small mass. The system can therefore accommodate the rapid back and forth flow of fluid resulting from high frequency vibrations.

A better understanding of the invention will be had by referring to the accompanying drawings, in which.

Figure 1:
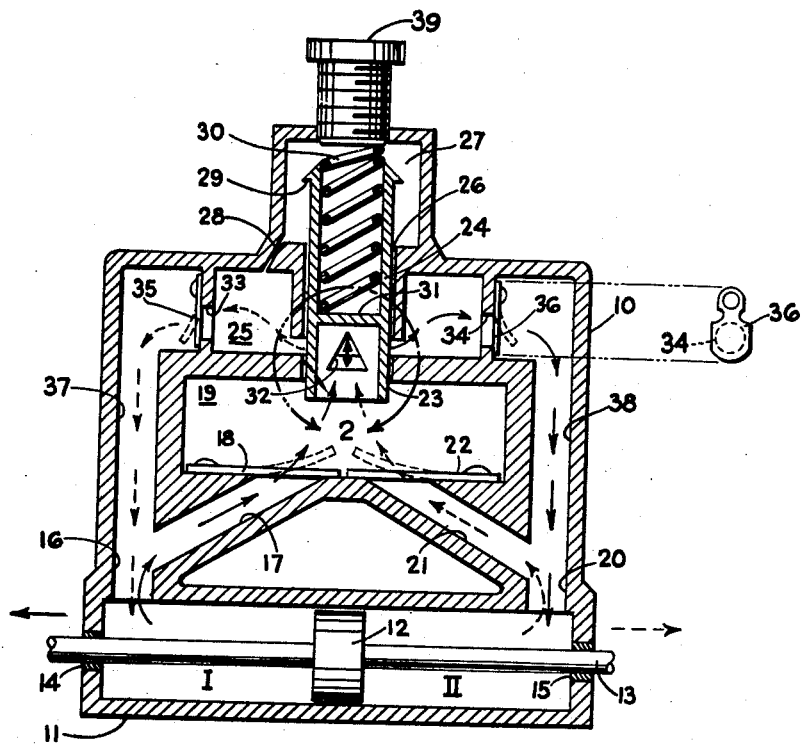
Fig. 1 is an elevational schematic view partially in cross-section illustrating the damping apparatus and valving control means of the invention.

Referring to Fig. 1, there is shown a damping apparatus, comprising a main body portion 10 integrally formed at its lower end with a hollow fluid damping cylinder 11. Within the cylinder 11, there is positioned a movable element in the form of a piston 12, reciprocally mounted on a piston rod 13, passing through suitable end bearing sleeves 14 and 15 in the cylinder 11. Back and forth motion of the piston in the cylinder, as indicated by the solid and dotted arrows, is resisted by a viscous fluid normally filling the cylinder. This resistance serves to dampen out motions and dissipate forces mechanically imparted to the piston as a result of undesired vibrations of a structural element such as a control surface on an aircraft. While a simple piston-cylinder arrangement has been shown as the fluid chamber and movable damping element, it is to be understood that other types of damping structures may be substituted. For example, a vane secured to a rotor hub and caused to sweep arcuately through fluid in a suitably designed chamber may be used.

Regardless of the particular configuration of the damping structure, the resistance offered to the moving element by the viscous fluid will depend in large part upon the freedom with which the fluid can flow from one side of the moving element to the other. Therefore, by regulating this flow, the resisting torques and damping forces in the structure may be controlled.

In Fig. 1, the portion of the fluid chamber to the left of piston 12 is designated I while the portion of the fluid chamber to the right of the piston is designated II. Chamber I includes a fluid passage opening 16 connecting with a branch passage 17, slanting upwardly in the body 10, and terminating in an opening covered by a reed valve 18. Reed valve 18, preferably in the form of a resilient strip, is suitably secured at one end to one wall of a central cavity 19. Similarly, chamber II includes a fluid passage opening 20 connecting with a branch passage 21 and terminating in an opening covered by a reed valve 22, also comprising a resilient strip secured to one wall of the central cavity 19.

The ceiling of cavity 19 is provided with a central bore opening 23 through which the lower end of a cylindrically shaped valve member 24 extends. The main body portion of the valve member 24 protrudes upwardly through the bore 23 into an annular valve chamber 25 defined in part by a sleeve portion 26 surrounding the valve member and extending coaxially downwardly, but terminating short of the upper end of the bore opening 23. The upper end of the valve member 24 passes through the top wall of the body 10 into an auxiliary chamber 27. Chamber 27 is placed in communication with the annular valve chamber 25 by a small bleeder passage 28.

With the above described arrangement, the valve member 24 is adapted to slide up and down within the bore 23 and sleeve portion 26. The extent of downward movement of the valve member is checked by the abutment of an annular shoulder 29 formed on the extreme upper end of the valve member, with the upper inner edge of the bore in the sleeve portion 26. A compression spring 30 is disposed between the top of the chamber 27 and a suitable blocking partition 31 within the valve member 24 to normally bias the valve member to its lowermost position. In Fig. 1, the valve member is shown in an intermediate position.

Fluid communication between the central cavity 19 and the valve chamber 25 takes place through a triangular shaped port opening 32 in the valve member 24. Referring particularly to the enlarged view of Fig. 2, it will be seen that portions of the port opening 32 are eclipsed by the lower edge 26' of the sleeve 26 and by the upper edge 23' of the bore opening 23. Because of the triangular shape of the port 32, the area of the uneclipsed portion of the port opening will vary with relative vertical motion between the valve member 24 and the eclipsing means 23 and 26.

Referring once again to Fig. 1, opposite ends of the annular chamber 25 are provided with exit ports 33 and 34 covered by reed valves 35 and 36, respectively. These ports respectively communicate with return fluid passages 37 and 38 when the reed valves 33 and 34 are open. The return passage 37 extends downwardly to pass into the fluid chamber portion I of the cylinder 11. Similarly, the return passage 38 extends downwardly to pass into the fluid chamber portion II of the cylinder.

In operation, movement of the piston 12 to the left as viewed in Fig. 1 and as indicated by the solid arrow, will force fluid out the port 16, through branch passage 17, and past the reed valve 18 into the central cavity 19, as indicated by the solid arrows. The disposition of the reed valve 18 over the opening of passage 17 in the cavity 19 enables the reed to act as a check valve, blocking fluid from flowing from the cavity 19 into the passage 17 by forcing the reed into tighter engagement with the periphery of the opening.

The pressure of the fluid in cavity 19 will act on the lower side of the partition 31 and thereby serve to urge the cylindrical valve member 24 upwardly to compress the spring 30. The resistance offered by the spring 30 may be made adjustable such as by means of a screw 39, for example. As the valve member moves upwardly, the triangular port opening 32 will move vertically past the eclipsing edges 23' and 26' of the bore 23 and sleeve 26 respectively and, because of the diverging side walls of the port periphery, a greater area of uneclipsed opening will be presented. Fluid will flow through this area into the annular chamber 25. A pressure drop across the valve member port opening will thereby be established and will have a value depending upon the size of the opening exposed. This pressure drop will be balanced by the downward force the spring 30 is exerting against the valve member 24.

The fluid in the annular chamber 25 will then pass through the reed valve 36 covering the exit port 34 and down the return passage 38 to the fluid chamber portion II on the other side of the piston 12.

When the piston 12 is moving to the right, as indicated by the dotted arrow, the fluid in the chamber portion II will follow the path of the dotted arrows passing up through the port opening 20, branch passage 21 and reed valve 22 into the central cavity 19. From the cavity 19, the fluid will continue through the port opening 32, into the annular chamber 25, out exit port 33, past the reed valve 35, and then down return passage 37 to the chamber portion I. The various reed valves thus act as check valves so that the fluid will always pass through the valve member port opening 32 in one direction.

When the fluid is traveling the path indicated by the solid arrows, it can only pass out of the valve chamber 25 through the reed valve 36 since the reed valve 35 is held closed by fluid pressure developed in the cylindrical fluid chamber portion I. Similarly, when the fluid is traveling along the path indicated by the dotted arrows, it can only pass out of the valve chamber 25 through the reed valve 35 since the reed valve 36 is held closed by fluid pressure developed in the chamber portion II.

The auxiliary chamber 27 is normally filled with fluid through the bleeder passage 28. This chamber and passage serve to dampen any undesired oscillatory motions of the valve member 24 and spring 30.

As mentioned earlier, the resisting force offered to movement of the piston 12 by the fluid in cylinder 11 will be largely determined by the freedom with which the fluid can pass from one of the chamber portions I or II through the valve member port opening to the other chamber portion. This freedom of flow will in turn be determined by the size of the port opening in the valve member through which the fluid must pass. The larger the area of the opening, the less will be the resistance to flow movement and the less will be the resisting forces acting on the piston.

Figures 2, 3:
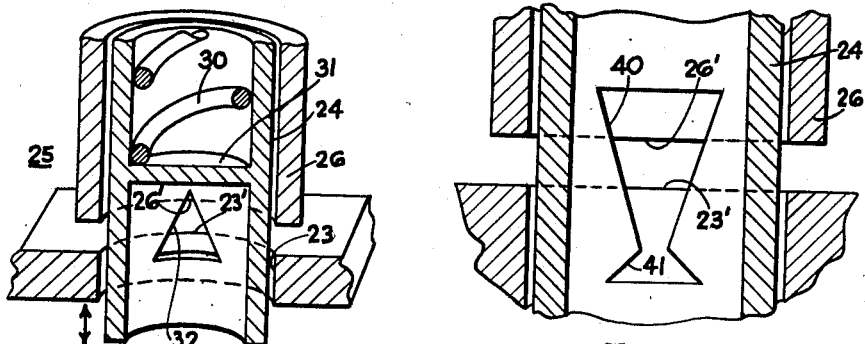
Fig. 2 is an enlarged cut-away perspective view of the valve member and port opening portion of the apparatus enclosed in the circle 2 of Fig. 1, and, Fig. 3 is an elevational cross-section of a modified port opening.

With a triangular shaped port opening as indicated clearly in Fig. 2, it will be seen that should the forces to be damped increase, the dynamic pressure of the fluid will be correspondingly increased by the piston 12. This increase in fluid pressure will urge the valve member upwardly against the natural bias of the spring 30 and thereby result in a port opening of greater width and thus area between the eclipsing edges 23' and 26'. With a greater port opening area, the fluid may flow more easily through the valve member and thereby the resisting forces offered to movement of the piston are decreased.

On the other hand, if the damping forces should decrease, the fluid pressure will decrease correspondingly and the spring 30 will urge the valve member 24 downwardly thereby decreasing the uneclipsed area of the port opening 32. This decrease in area will increase the resistance of fluid flow through the valve member and thereby increase the resisting forces offered to movement of the piston.

It will be seen accordingly, that the described valving means automatically adjusts the damping resistance in accordance with the fluid pressure, which fluid pressure depends in turn upon the nature of the motions or forces to be damped.

In the case of high frequency vibrations, the piston 12 will be reciprocating relatively rapidly within the fluid cylinder 11. Peak torques developed in the structure will be relatively high because of the relatively large increase in the fluid resisting force as a result of these high speeds. These large resisting torques will be reflected in high fluid pressures serving to open up the port 32 to its maximum value. By suitably dimensioning the base portion of the port opening periphery to result in a relatively large area when the valve member 25 is urged to its uppermost position, the contemplated pressure drops through the port opening can be limited to values which will not over-stress the damper components or the structural members to which the damper is secured.

In certain applications, it may be desirable, over a certain range of frequencies, to damp out only the higher frequency, smaller amplitude forces, and not damp materially the lower frequency, larger amplitudes. For this purpose, a modified type of port opening such as shown in Fig. 3 may be used. In Fig. 3 this port opening has downwardly converging side walls 40 at its upper portion. Close to the bottom peripheral edge of the opening, the side walls diverge as indicated at 41. With this arrangement, an increase in damping force and thus fluid pressure, as a result of higher frequencies, for example, will urge the valve member 24 upwardly and result in a decreased uneclipsed area as defined by the sides of the port opening and the eclipsing edges 26' and 23'. Thus, the resistance to movement of the damping piston will be further increased. On the other hand, when the damping resistance decreases, as is generally the case with lower frequency, larger amplitude vibrations, the resulting drop in fluid pressure will permit the spring to move the valve member 24 downwardly, thereby increasing the area of uneclipsed opening. This increase in the opening will decrease the damping resistance.

It will be noted that in the case of increasing damping resistances, should the forces increase beyond a safe value, the extreme lower-most portion of the port opening will be exposed, and in view of the diverging side walls 41, the resisting torques developed will be rapidly decreased.

It is, of course, possible to use other peripheral configurations for the port openings, depending upon the particular functional relationship between the fluid pressure and damping resistance desired.

In order to insure accuracy in the mechanical movement of the valve member 24 in response to fluid pressure, it is important that the fluid pass through the port opening in only one direction. To control the flow of the fluid past the opening in one direction, it is necessary to use the fluid check valves described. An important feature of the present invention is the use of feeds for this purpose. The small mass of the resilient strip constituting the reed enables these valves to open and close with extreme rapidity whereby the rapid motion of fluid as a result of high frequency, small amplitude vibrations is accommodated.

While only a particular embodiment of the damping apparatus has been disclosed and described, it is to be understood that modifications within the scope and spirit of the invention will occur to those skilled in the art. The invention, therefore, is not to be thought of as limited to the particular apparatus chosen for illustrative purposes.

What is claimed is:

1. In a damping apparatus including a damping fluid chamber and a movable element in said fluid chamber subject to high frequency, small amplitude, oscillatory forces desired to be damped, valve means for controlling the rate of flow of fluid from a first portion of said fluid chamber on one side of said movable element to a second portion of said fluid chamber on the other side of said movable element, whereby the resistance to oscillatory movement of said element between said first portion and said second portion may be controlled, said valve means comprising: a first fluid passage in communication with said first portion of said fluid chamber; a second fluid passage in communication with said second portion of the fluid chamber; said first and second fluid passages terminating in a central cavity; reed valves in the form of flat resilient strips secured with respect to the walls of said cavity and normally covering the openings of said first and second fluid passages into said central cavity, whereby fluid may pass from said passages into said cavity but is blocked from passing from said cavity into said passages; a valve chamber having a common wall with said cavity; an elongated valve member having a hollow interior and open ends passing through an opening in said common wall such that one open end extends partially within said cavity and the other open end extends partially within said valve chamber; a fluid tight transverse partition positioned within the hollow interior of said valve member, whereby fluid pressure in said cavity acts on one side of said partition, a side wall of said valve member having a port opening positioned between said one side of said partition and said one open end for passing fluid from said cavity into said valve chamber; a guide sleeve in said valve chamber surrounding said other open end portion of said valve member for guiding movement of said valve member back and forth through said opening in said common wall, said sleeve terminating short of said common wall to provide, in combination with a peripheral edge of said opening, an eclipsing means covering a portion of said port opening in said valve member; biasing means acting on the other side of said partition in opposition to said fluid pressure whereby the position of said port with respect to said eclipsing means varies with said fluid pressure, said port opening having diverging peripheral edges such that the area of the uneclipsed portion of said port opening varies with changes in the position of said valve member in said opening; first and second return fluid passages passing from openings in said valve chamber and communicating respectively with said first and second chamber portions; and reed valves in the form of flat resilient strips secured with respect to the outer walls of said valve chamber and covering said openings whereby fluid may pass from said valve chamber into said return passages, but is blocked from passing from said return passages into said valve chamber.

2. The subject matter of claim 1, in which said reed valves are adapted to open and close at a frequency corresponding to the oscillation frequency of said movable element.

3. The subject matter of claim 1, in which said guide sleeve extends into an auxiliary enclosure for housing said biasing means; said auxiliary enclosure being in communication with said valve chamber through a bleeder passage whereby movement of said valve member in said sleeve is damped by fluid in said auxiliary enclosure passing back and forth through said bleeder passage to said valve chamber.

References Cited in the file of this patent

UNITED STATES PATENTS

| | | |
|---|---|---|
| 1,094,267 | Sullivan | Apr. 21, 1914 |
| 1,406,216 | Olson | Feb. 14, 1922 |
| 1,593,313 | Solemink | July 20, 1926 |
| 1,984,539 | Nalle | Dec. 18, 1934 |
| 1,989,498 | Rossman | Jan. 29, 1935 |
| 1,998,020 | Mezger | Apr. 16, 1935 |
| 2,240,644 | Focht | May 6, 1941 |
| 2,672,955 | Lucien | Mar. 23, 1954 |
| 2,722,289 | Girard | Nov. 1, 1955 |

FOREIGN PATENTS

| | | |
|---|---|---|
| 722,476 | France | Dec. 29, 1931 |